United States Patent
Jacques Da Silva et al.

(10) Patent No.: US 9,471,438 B1
(45) Date of Patent: Oct. 18, 2016

(54) ADAPTIVE INCREMENTAL CHECKPOINTING FOR DATA STREAM PROCESSING APPLICATIONS

(71) Applicant: International Business Machines Corporation, Armonk, NY (US)

(72) Inventors: Gabriela Jacques Da Silva, Brooklyn, NY (US); Kun-Lung Wu, Yorktown Heights, NY (US); Fang Zheng, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/962,928

(22) Filed: Dec. 8, 2015

(51) Int. Cl.
*G06F 11/00* (2006.01)
*G06F 11/14* (2006.01)
*H04L 29/06* (2006.01)

(52) U.S. Cl.
CPC ....... *G06F 11/1451* (2013.01); *G06F 11/1464* (2013.01); *H04L 65/4069* (2013.01); *G06F 2201/805* (2013.01); *G06F 2201/84* (2013.01)

(58) Field of Classification Search
CPC ........... G06F 11/1451; G06F 11/1464; H04L 65/4069
See application file for complete search history.

(56) References Cited

U.S. PATENT DOCUMENTS

| | | | |
|---|---|---|---|
| 7,039,663 B1 | 5/2006 | Federwisch et al. | |
| 7,953,774 B2 | 5/2011 | Cong et al. | |
| 8,281,317 B1 * | 10/2012 | Backensto | G06F 11/1438 719/312 |
| 8,285,869 B1 * | 10/2012 | Graetz | G06F 11/1402 707/999.202 |
| 8,627,143 B2 | 1/2014 | Ranganathan et al. | |
| 8,949,801 B2 | 2/2015 | Andrade et al. | |
| 2010/0293532 A1 * | 11/2010 | Andrade | G06F 11/1438 717/140 |
| 2014/0317448 A1 | 10/2014 | Rash et al. | |

OTHER PUBLICATIONS

Agarwal et al., "Adaptive Incremental Checkpointing for Massively Parallel Systems", 2004, ICS '04, Jun. 26-Jul. 1, 2004, Saint-Malo France, pp. 277-286.*

* cited by examiner

*Primary Examiner* — Michael Maskulinski
(74) *Attorney, Agent, or Firm* — Scully, Scott, Murphy & Presser, P.C.; Kurt Goudy, Esq.

(57) ABSTRACT

A system, method and computer program product for adaptive incremental checkpointing an operator state in a streaming application. The system and method enable reduced costs of checkpointing an operator state in a streaming application, by i) logging updates to operator state and checkpointing operator state in either base (full state) or delta (logged updates) form, ii) dynamically and adaptively adjusting checkpointing options, and iii) maintaining dependencies between checkpoints to allow automatic restoration and checkpoint recycling.

21 Claims, 14 Drawing Sheets

ADAPTIVE INCREMENTAL CHECKPOINTING FOR DATA STREAM PROCESSING APPLICATIONS

FIELD

The present disclosure relates to adaptive incremental data checkpoint system and method for reducing costs of fault tolerance for data stream processing applications via adaptive, incremental checkpointing.

BACKGROUND

Stream processing applications have emerged as a paradigm for analyzing streaming data (e.g., audio, video, sensor readings, and business data) in real time. Stream processing applications are typically built as data-flow graphs comprising interconnected stream operators that implement analytics over the incoming data streams. Each of these operators is a component.

During operation of a stream processing application, a stream operator may fail (i.e., stop executing its operations or responding to other operators) for any one or more of several reasons, including, but not limited to: a heisenbug (i.e., a computer bug that disappears or alters its characteristics when an attempt is made to study it) in the stream operator code (e.g., a timing error), a node failure (e.g., a power outage), a kernel failure (e.g., a device driver crashes and forces a machine reboot), a transient hardware failure (e.g., a memory error corrupts an application variable and causes the stream processing application to crash), or a network failure (e.g., the network cable gets disconnected, and no other node can send data to the operator).

Many data stream processing applications, in the form of one and more operators connected via data streams, maintain large state in memory (such as sliding windows or bloom filters) in order to perform various analytics (such as sorting, aggregation, and join). For fault tolerance purposes, a data stream processing application may need to periodically checkpoint its state to a persistent storage (termed "checkpoint data store") so that, in case of a failure, the application can recover its state from saved checkpoint and resume normal operations.

Unfortunately, checkpointing a large operator state can incur significant overheads to the stream processing application and the checkpoint data store. The standard approach of checkpointing an operator state is to serialize all the operator state data and store the serialized data onto the checkpoint data store. For an operator with a large state, the application needs to spend substantial amounts of time in serializing and writing the state to the checkpoint data store, which stalls normal processing. Furthermore, the checkpointed large state data usually consume a huge storage space and I/O bandwidth of the checkpoint data store.

However, in many stream processing applications, the amount of changes of an operator state between two consecutive checkpoints is usually much smaller than the total operator state size. In this case, it would be more efficient to checkpoint only the changed portion of the large operator state rather than the whole state. Hence, a need is recognized to devise an incremental checkpointing method for stream processing applications.

While prior existing incremental checkpointing schemes exist, including paging-based approaches, pre-copying based approaches and hash-based approaches, all of these approaches more or less address the recording of changes to application state during normal computation and checkpointing the logged changes as a delta checkpoint. Some of them checkpoint the whole application address apace (e.g., by detecting and tracking dirty pages in application address space, and saving the dirty pages as delta checkpoint), and are inappropriate for checkpointing an operator state which is only a part of application address space. Most paging and pre-copy approaches require modification to Operating System or Virtual Machine Monitor or installing kernel modules, which may not be feasible in practice. Besides, prior incremental checkpointing approaches largely ignores the restoration cost and can degrade the restoration time arbitrarily; this is inappropriate for data stream processing applications, as long restoration time may not only lead to unacceptable delay in stream processing, but also overwhelm the data sources and intermediate buffers and cause data loss.

SUMMARY

A system, method and computer program product for adaptive incremental checkpointing an operator state in a stream processing application.

The system and method enable reduced costs of checkpointing an operator state in a stream processing application, by i) logging updates to operator state and periodically checkpointing operator state in either base (full state) or delta (logged updates) form, ii) dynamically and adaptively adjusting checkpointing options, and iii) maintaining dependencies between checkpoints to allow automatic restoration and checkpoint recycling.

In one aspect, there is provided a computer-implemented method for adaptively and incrementally checkpointing an operator state in a data stream processing application. The application comprising: during operation of the stream processing application, logging changes to variables in an operator state, and one of: apply checkpointing to the operator state variables according to a base checkpoint data form which saves data of a whole full operator state; or apply incremental checkpointing of only the logged changes to those operator state variables as a delta checkpoint data in a data storage device; and upon performing a base checkpoint, determining adaptively how many subsequent checkpoints will be stored as delta checkpoints between two consecutive base checkpoints.

There is further provided a system for adaptively and incrementally checkpointing an operator state in a data stream processing application. The system comprises: a data storage device; and a processor device running a data stream processing application in communication with the data storage device, the processor device further configured to: during operation of the stream processing application, log changes to variables in an operator state, and one of: apply a checkpoint the operator state variables according to a base checkpoint data form which saves data of a whole full operator state; or apply an incremental checkpoint of only the logged changes to those operator state variables as a delta checkpoint data in a data storage device; and upon performing a base checkpoint, determine adaptively how many subsequent checkpoints will be stored as delta checkpoints between two consecutive base checkpoints.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

A system, method and computer program product are provided for incrementally checkpointing an operator state in a stream processing application. In particular, an adaptive incremental checkpointing method for data stream processing applications is provided.

Figure 1:
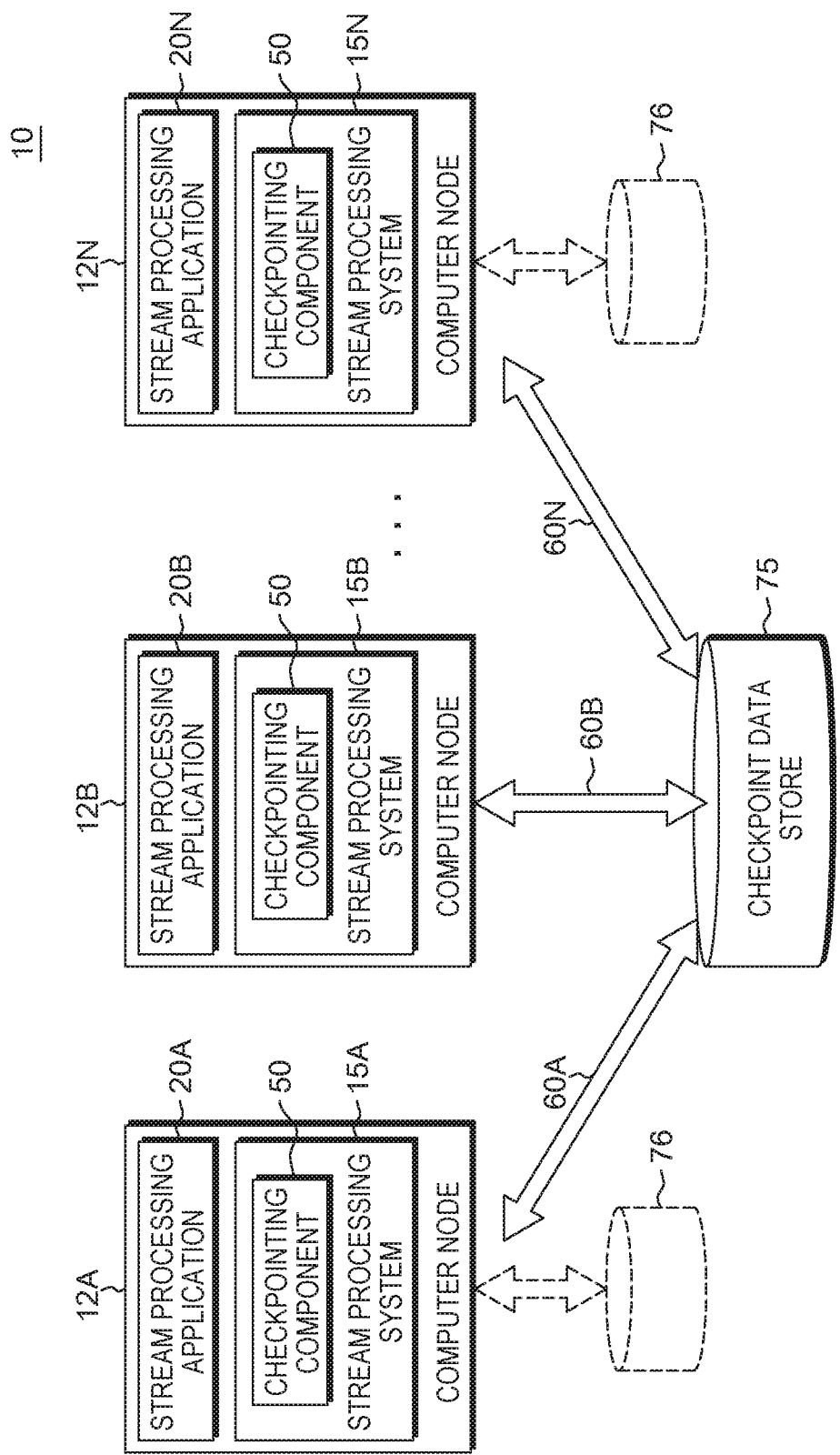
FIG. 1 shows a system implementing methods for incrementally checkpointing operator states in a stream processing application.

FIG. 1 shows a system 10 implementing methods for incrementally checkpointing operator states in a streaming application.

Here, plural processing nodes 12A, . . . , 12N are shown, each node running a respective stream processing system 15A, 15B, . . . , 15N that provides a runtime environment for a respective Streaming Application 20A, 20B, . . . , 20N. Here, a stream processing application 20A, . . . , 20N resides in a node and is managed at a respective node via a respective stream processing system. Each stream processing system 15A, 15B, . . . , 15N includes an executable component 50 for incrementally checkpointing application state data according to the methods described herein. The processing results include incrementally checkpointed application state data 60A, 60B, . . . , 60N that are stored in a checkpoint data storage device such as a persistent storage device 75. The system 10 processing nodes may be encompassed by computing devices, e.g., desktop, laptops, services, mobile devices, that may accessible via networked and/or cloud communications infrastructure, e.g., via a LAN, WAN, wireless and/or wired public or private communications network, e.g., via internet or virtual private network. Thus, via networked communications, devices 12A, . . . , 12N may enable applications to read, write and delete checkpoints relating to application state 60A, 60B, . . . , 60N.

In one embodiment, stream processing applications 20A, 20B, . . . , 20N are run on multiple local or externally distributed compute nodes. Alternatively, the checkpoint data can be stored in a Key-Value Store which is locally available on each compute node as depicted by a respective storage device 76 local to the compute nodes. This key-value store may be a persistent data store. In such an alternative embodiment, read, write, delete checkpoints are performed at the local storage medium. The respective checkpointed data 60A, 60B . . . , 60N may also be stored on a networked key-value store on a network enabling storage, such as open-source software products Redis® and Cassandra™ (e.g., Redis® is a trademark of Salvatore Sanfilippo and Cassandra™ is a trademark of the Apache Software Foundation).

Figure 2:
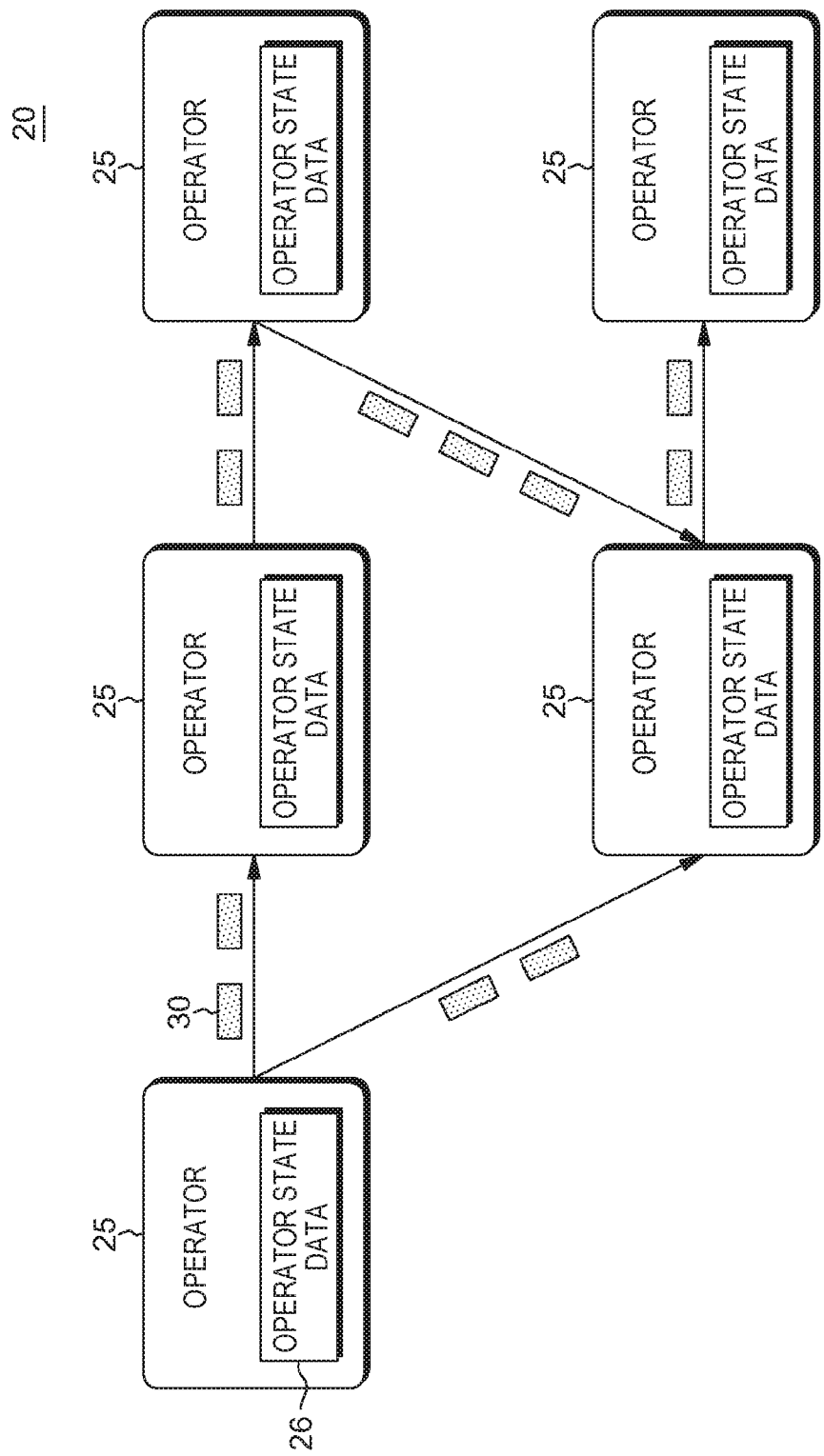
FIG. 2 shows a stream processing application that is composed of a set of operators.

FIG. 2 shows a stream processing application 20 that is composed of a set of operators 25. Here, the set of operators communicate with each other by sending streams of data representing events that are represented as data tuples 30, for example. Each operator 25 performs some computation on incoming tuples 30, and an operator can keep arbitrary data 26 in a memory as its state.

Figure 3:
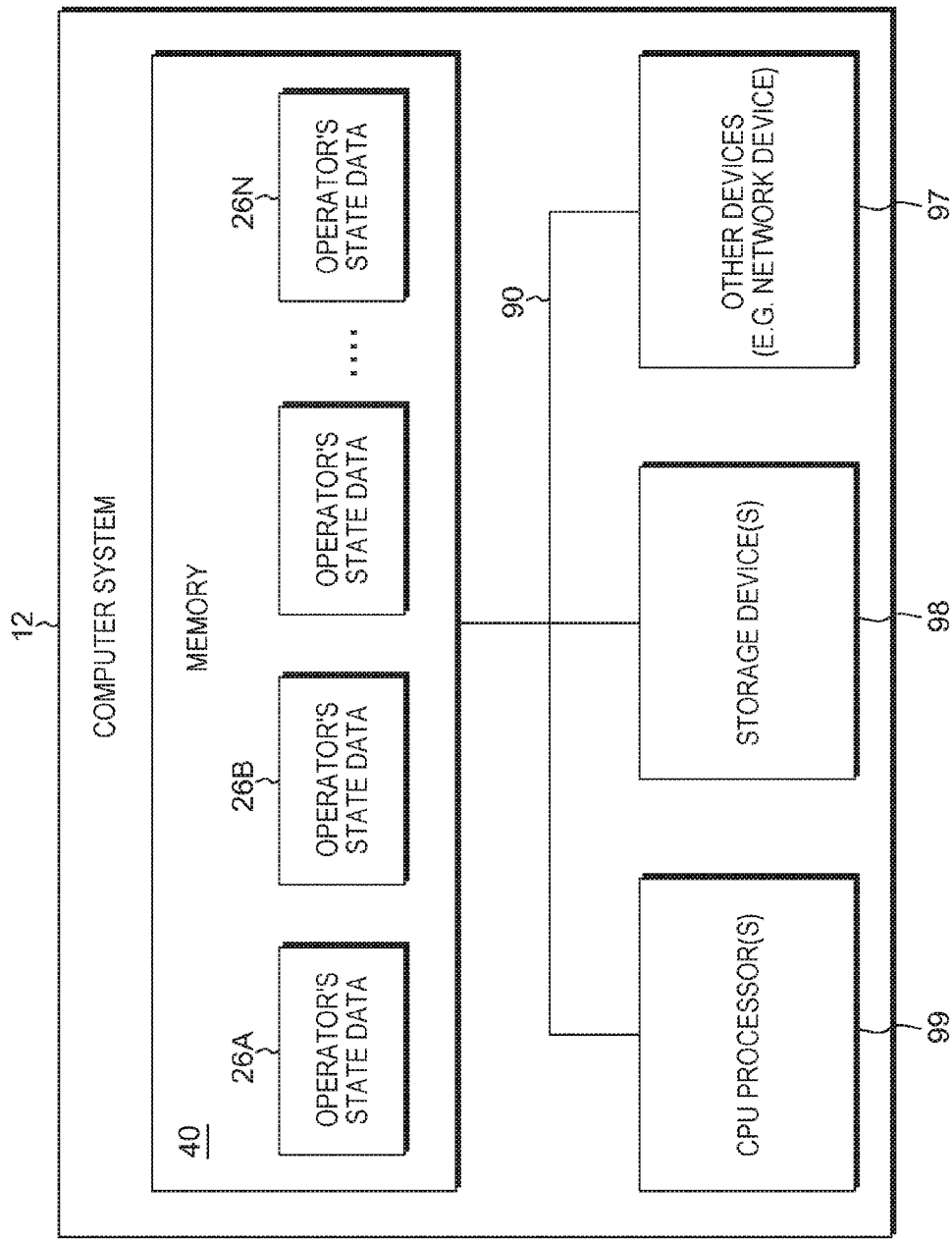
FIG. 3 shows a system memory storage environment in which operators' state data may be stored.

FIG. 3 shows a system memory storage environment 40 in which operators' state data 26 may reside in. That is, each respective computing node 12 includes a memory 40 in which operator state data 26A, 26B, . . . 26N may reside associated with a respective operator of a stream processing application. Here, a stream processing application may be stored in a computer system comprising a central processing unit (CPU) 98 or like controller device connected via internal system and data/address busses 90 to an associated memory device, and to a network interface 97 for enabling network communication at node 12 over wired or wireless networks. In one embodiment, via a display interface, a user may specify whether a particular variable is to be stored as operator state data, i.e., whether a variable is to checkpointed or not by the checkpointing component 50.

Figure 4:
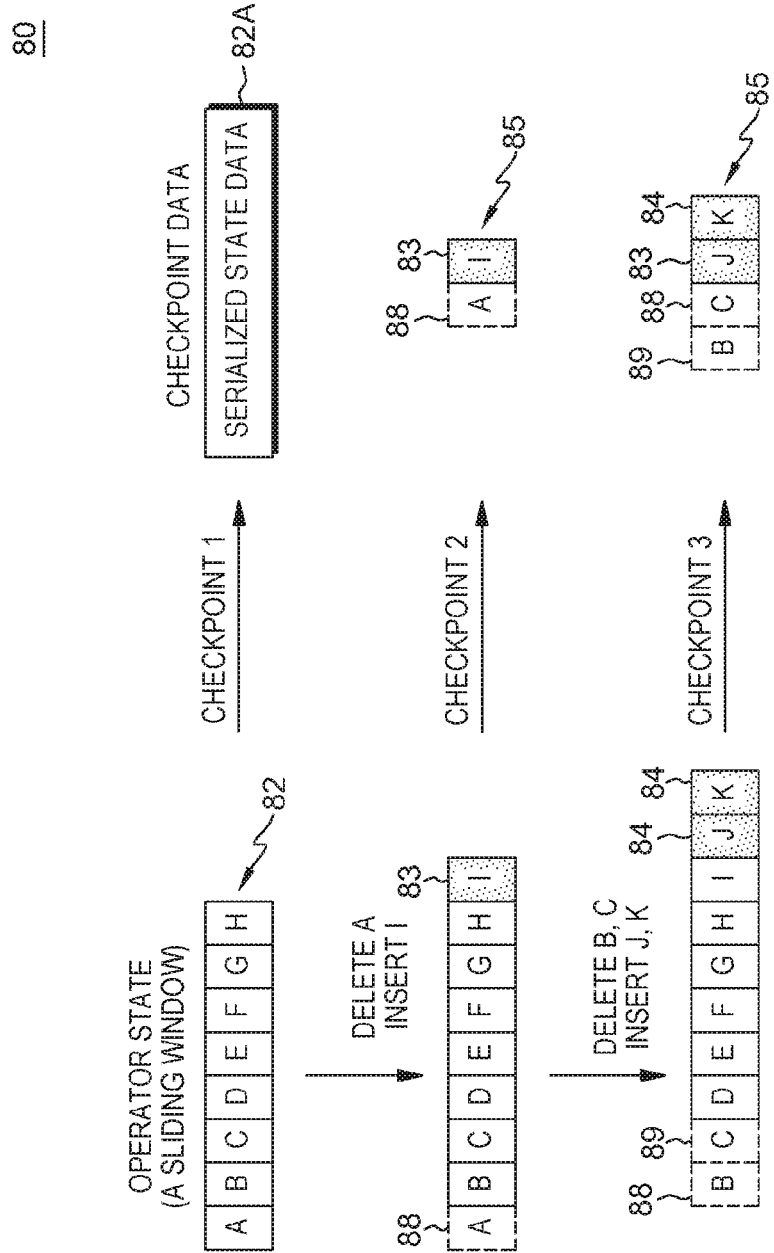
FIG. 4 shows an incremental checkpointing sequence illustrating incremental checkpointing operations performed.

FIG. 4 shows an incremental checkpointing sequence 80 illustrating incremental checkpointing operations performed as follows: The operator state in this example is a sliding window of data items. In the first checkpoint, the full operator state 82 is checkpointed and stored as a "base checkpoint" 82A at the checkpointdata store 75. This base checkpoint is stored as a serialized application state, and subsequent checkpoints only store the changes to operator state since the previous checkpoint, i.e., as "delta checkpoints" 85. The changes made to an operator state during normal computation between two checkpoints are tracked and recorded as delta checkpoints 85. In the example shown, after the first checkpoint 82A is taken, the application makes two changes to the operator state during normal computation: the deletion of data item "A" 88 from the sliding window and the inserting of data item 83 into the sliding window. Thus, in the subsequent checkpoint (i.e., checkpoint 2) 85, only the changed portions of the operator state data 83, 88 are recorded to form a delta checkpoint 85. Similarly, during normal computation between the second and the third checkpoints, data items 89 are deleted and new data items 84 are inserted to the sliding window, then only these changed operator state data 84, 89 will be recorded as the new "delta checkpoint" (i.e., checkpoint 3) 85.

In one embodiment, if the size of changed portion is smaller than the whole operator state size, the checkpoint size is reduced, and the checkpointing time is improved as well. Upon restoring the operator state, the base and delta checkpoints are fetched back from the checkpoint data store 75, and get merged to re-create the latest state of the operator.

Figure 5:
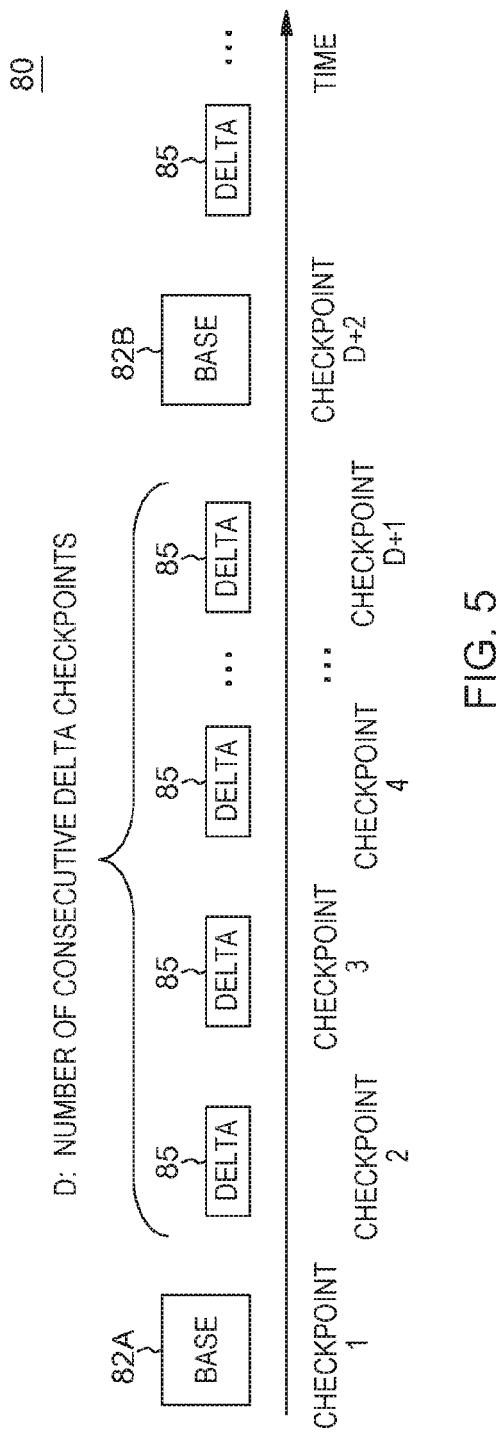
FIG. 5 shows an example timeline of the incremental checkpointing operations as run by checkpointing component of a node.

FIG. 5 shows an example timeline of the incremental checkpointing operations as run by checkpointing component 50 of a node 12. Generally, in the method, a whole operator state is first checkpointed to form the "base checkpoint" 82A. Then the changes made to an operator state during normal computation between two checkpoints are tracked and recorded at the local memory 40. In a subsequent checkpoint 85, only the changed portion of the operator state is checkpointed to form a "delta checkpoint" on the checkpoint data store 75. This tracking changes and recording continues for successive checkpoints 85 (checkpoint 2, 3, ..., D+1) until such time as a second "base" checkpoint 82B is performed at checkpoint D+2. Between the two base checkpoints, there are D consecutive delta checkpoints. If the size of changed portion is smaller than the whole operator state size, the checkpoint size is reduced and the checkpointing time is improved as well.

Upon restoring the operator state, the base and delta checkpoints are fetched back from the checkpoint data store 75, and get merged to re-create the latest state of the operator.

Figure 6:
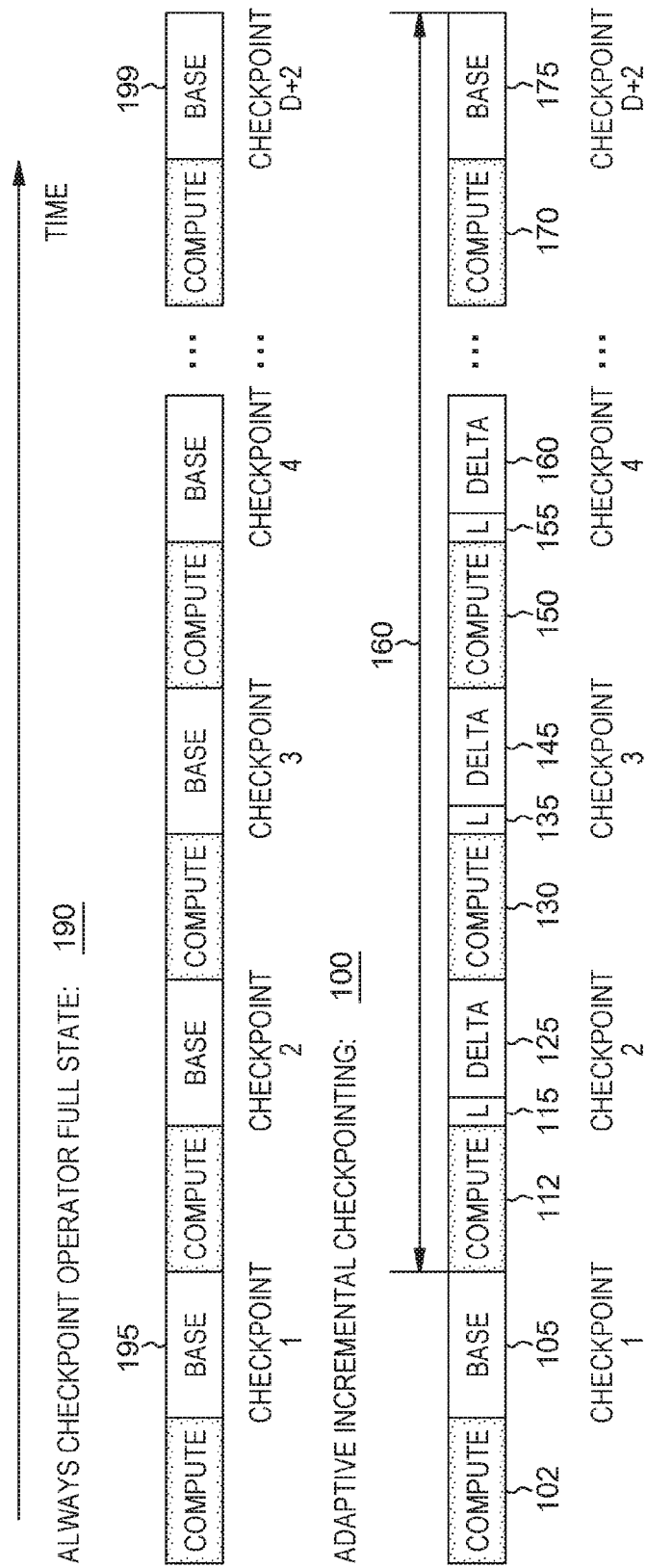
FIG. 6 shows a more detailed time line showing the differences in the timing of operations in performing the incremental checkpointing techniques in the described embodiments vs. the timing of always checkpointing full operator state.

FIG. 6 shows a more detailed time line 100 showing the timing of operations in performing the incremental checkpointing technique. Herein, in the example shown, during normal computation, the method logs the changes to an operator state, and periodically checkpointing the operator state in either base checkpoint (i.e., the full operator state) or delta checkpoint (i.e., logged changes to the operator state).

In FIG. 6, after an stream processing application operator performs a computation on a piece of data at 102, the checkpointing component 50 performs a first checkpoint (Checkpoint 1) which is to checkpoint a full operator state, i.e., a base checkpoint. For purposes of description, a time duration for performing normal computation between two checkpoints is defined as a time duration parameter "Tcomp" and a time duration for performing a full operator state checkpoint is defined as a time duration parameter "TckptBase". After a further computation is performed at 112, the changes to data variables are logged as operator state data at 115. A time duration for logging changes to operator state (e.g., insertions and/or deletions) is defined as a time duration parameter "Tlog". Please note that logging may be spread over a whole normal computation duration, and for purpose of simplifying illustration, the timeline 100 in FIG. 6 shows the logging time durations in periods denoted by "L" which are separate from normal computation durations. Then, at 125 corresponding to a time Checkpoint 2, a delta checkpoint is performed to save those recently logged changes to operator state data in the checkpoint data store 75. A time duration for taking a delta checkpoint is defined as a time duration parameter "TckptDelta". This process 100 is continued and after a next computation is performed at 130, the changes to data variables are logged as operator state data at 135. Then, at 145 corresponding to a time Checkpoint 3, a delta checkpoint is performed to save those recently logged operator state data changes in the checkpoint data store 75. This process 100 is continued and results in subsequent delta checkpoints 4 to D+1 to be generated. Then, after a next computation involving that operator is performed at 170 the checkpointing method in this embodiment is programmed to store a second full base checkpoint state at corresponding time Checkpoint D+2.

In one embodiment, there is used measured historical checkpoint time/sizes to determine the values for TckptBase, Tcomp, TckptDelta and Tlog parameter values.

FIG. 6 further shows a further timeline 190 of the timing of checkpoint operations 190 using conventional non-incremental techniques in which full operator state (i.e., base) checkpoint operations are always performed according to conventional checkpoint techniques. Compared to the timeline 100 for performing checkpoint operations Checkpoints 1, 2, 3, 4, ..., D+2 according to incremental methods, the same checkpoint operations Checkpoints 1, 2, 3, 4, ..., D+2 performed according to conventional techniques take longer time in addition to using more resources of the checkpoint data store. That is, an example run of conventional checkpoint operation 195 through a last conventional checkpoint operation 199 at Checkpoint D+2 is longer compared to the time it takes to perform the same operations 105 through 175 including the time of logging changes to operator state (e.g., additions and/or deletions) and the delta checkpointing according to incremental checkpointing techniques.

Thus, as depicted in the example timelines 100, 190 of FIG. 6 there are two key trade-offs when using incremental checkpointing: 1) logging cost (e.g., for logging changes made to operator state data such as at times 115, 135, 155) vs. reduced checkpoint time and size (i.e., size of delta checkpoint data stored and time it takes to store the delta checkpoint data); and 2) reduced checkpoint time (e.g., reduced at corresponding delta checkpoint times 125, 145, 165 defined as a time duration TckptDelta) vs. increased restore time, i.e., the time it takes to read the base checkpoint and all related delta checkpoints from the checkpoint data store, and merge them to restore the latest operator state.

That is, with incremental checkpointing, an operator first saves its full state in a base checkpoint. Each subsequent checkpoint only saves the portion of the state which is changed since previous checkpoint. As shown in FIG. 5, there are two fundamental trade-offs with incremental checkpointing. 1. Reducing checkpointing cost vs. Increasing overhead to normal computation: in order to generate a delta checkpoint, some logging work is needed to identify what is changed since the last checkpoint. Such logging adds overheads to normal computation and in turn reduces the checkpointing cost. 2. Reducing checkpointing cost vs. Increasing restoration cost: if a delta checkpoint is smaller than a full checkpoint, then taking more delta checkpoints would increase the performance gains. However, doing so would also increase the time to restore the last delta checkpoint, because the base checkpoint and all previous delta checkpoint(s) need to be retrieved and merged with the last delta checkpoint. Therefore, the number of consecutive delta checkpoints should be set so that the restoration cost is bounded to an acceptable level while the application still gets as much savings from delta checkpoints as possible.

Bounding the restoration time is important for data stream processing applications, even through restoration may rarely occur. A long pause during restoration may violate application's throughput and latency requirements. Besides, for many applications with high ingestion rates, a long restoration time can overwhelm the data source and any intermediate buffers, or cause tuple loss due to load shedding.

In one embodiment the present method and checkpointing system is adaptive in that it handles dynamics in operator state's change pattern. An operator state's change pattern is defined as the amount of changes to operator state in a time unit. Throughout an application's runtime, the change pattern may vary, sometimes dramatically (e.g., due to fluctuations in input rate). Accordingly, the sizes of delta checkpoints may change over time. As illustrated in FIG. 5, in a first instance when delta check-points are small, a large number of delta checkpoints can be taken to obtain great savings in checkpoint time without unduly degrading restoration cost. In a second instance when delta checkpoints are large, fewer delta checkpoints should be taken to keep the same restoration cost.

Figure 7:
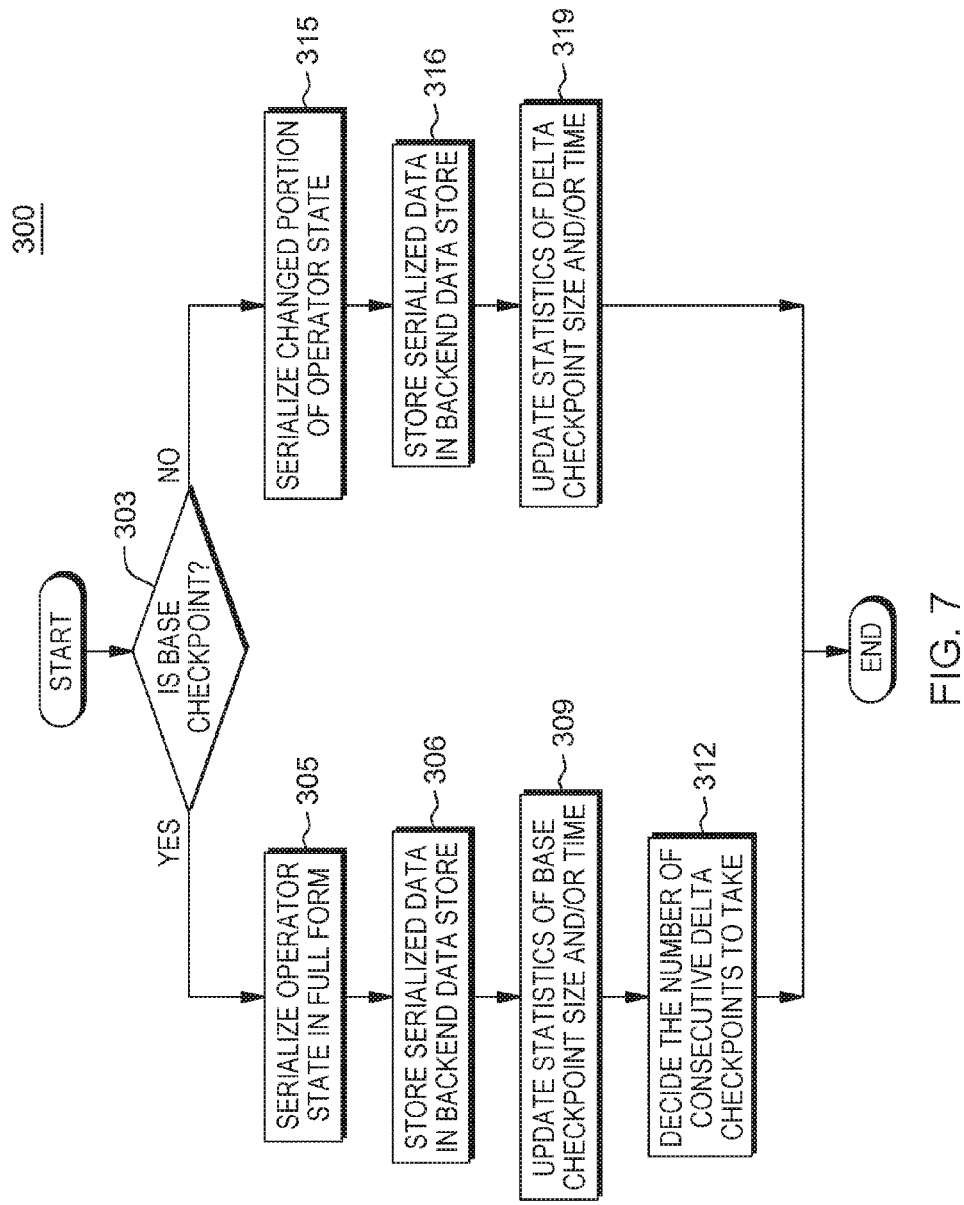
FIG. 7 shows a method employed for incremental checkpointing of an operator state that adapts to dynamics of an operator state's change pattern.

FIG. 7 shows a method 300 employed for incremental checkpointing of an operator state that adapts to dynamics of an operator state's change pattern The method 300 of FIG. 7, in one aspect: 1) Tracks changes to the operator state during normal computations 112, 130, 150 of FIG. 6. This enables generating of delta checkpoints resulting in lower overheads to normal computation; 2) Determines whether or not incremental checkpointing is beneficial, and adjust the checkpointing option (base or delta) accordingly to improve overall application performance, and additionally meanwhile bound the restore time to a configurable level. Such determination and adjustment is automatically performed at runtime to cope with dynamics in the change pattern to operator state; 3) Stores checkpoints in a key-value store. The data organization reflects the dependency among checkpoints so that checkpoints can be correctly restored and deleted. The data organization achieves good storage efficiency and fast read, write, and deletion performance. The data organization should be applicable to any key-value storage scheme; 4) When restoring from a delta checkpoint, retrieves and merges the related base and delta checkpoints to restore operator state. The identification, retrieval and merge of related checkpoints are transparent to application; and 5) When deleting a checkpoint, ensures that the deletion does not render the operator state unrecoverable.

In order to generate a delta checkpoint, changes made to operator state are tracked since the previous checkpoint. Existing methods of tracking changes to application state can be divided into two categories. The first category is coarse-grained: they consider the state of an application to be all the memory pages and system resources (e.g., files opened) owned by application processes. The second category is fine-grained: they only track changes made to certain ranges of memory addresses or a set of data variables as specified by application. For both categories, one implementations can be based on dirty bit in page table entries, write protection and copy-on-write, or hashing. For many stream processing systems, fine-grained tracking methods are more desirable than coarse-grained ones. The operator state to checkpoint is usually a set of in-memory variables (e.g., a counter or a sliding window) which is a part of the whole address space. Therefore, a tracking method which targets changes to only those variables to be checkpointed is more efficient than coarse-grained methods. As one such fine-grained tracking method, a data-structure level logging method may be used.

Nevertheless, any method can be used to track changes to operator state, provided that the time and space overhead posed to normal computation is kept at an acceptable level. However, the used tracking method provides a control interface to enable and disable tracking at runtime. If a coarse-grained tracking method is used, the whole address space may be treated as a single "variable", hence making it a special case of fine-grained tracking.

In FIG. 7, once a stream processing application is up and running, and the checkpointing mechanism has started, the checkpoint method includes a first determination at 303 as to whether a current checkpoint to be taken is a "base" checkpoint (i.e., checkpointing a full operator state) or "delta" checkpoint (logged changes to operator state). If it is determined that the current checkpoint is a base checkpoint, then the process proceeds to 305 where the checkpointing component 50 obtains and serializes operator state in its "full" form, e.g., all variable states are stored. The full base checkpointed data is stored at 306 as serialized data in a checkpoint data store, e.g., database 75 of FIG. 1. In one embodiment, a checkpoint data store may be a persistent data storage device. Then at 309 there is performed an update of statistics, e.g., performance statistics, that represent the base checkpoint size and/or time it takes to perform the base checkpoint. At 312, the checkpointing method decides the number of consecutive delta checkpoints (a parameter termed "Delta Checkpoint Number") to take.

Otherwise, referring to step 303, if it is determined that a current checkpoint to be taken is not a "base" checkpoint (i.e., not checkpointing a full operator state), the process proceeds to step 315 in which a delta checkpoint is obtained, i.e., there is obtained and serialized a changed portion (delta) of the operator state. The serialized checkpointed data is stored at 316 in the checkpoint data store, e.g., database 75 of FIG. 1. Then, at 319 the checkpointing method performs an update of statistics, e.g., performance statistics, that represent the delta checkpoint size and/or time it takes to perform the delta checkpoint.

In view of the method of FIG. 7, when an operator starts, the Delta Checkpoint Number is set to an initial value D0 (e.g., a value of 1 or any positive integer), and change tracking is disabled. Upon the first checkpoint, the runtime saves full operator state to form a base checkpoint. Because the next checkpoint will be a delta (as Delta Checkpoint Number is non-zero), change tracking is enabled in subsequent computation period. For the next D0 checkpoints, the method generates D0 delta checkpoints. Upon the completion of the last delta checkpoint, the method disables change tracking. Since then, the operator performs normal computation without tracking change until it reaches the next checkpoint. This checkpoint is saved as a new base checkpoint. As one step of taking this base checkpoint, a function named adjustD( ) is called at step 312 to determine a new Delta Checkpoint Number, i.e., how many consecutive delta checkpoints to generate after this base checkpoint. From the new Delta Checkpoint Number D', the method knows whether the next checkpoint will be base (if D' is zero) or delta (otherwise), and disables or enables change tracking accordingly.

After this base checkpoint is taken, the operator resumes normal computation, and takes another D' delta checkpoints. After the last delta checkpoint is taken, change tracking is disabled again. Then the operator performs normal computation and takes another new base checkpoint, during which a new Delta Checkpoint Number value is calculated. This procedure repeats throughout operator runtime.

Figure 8:
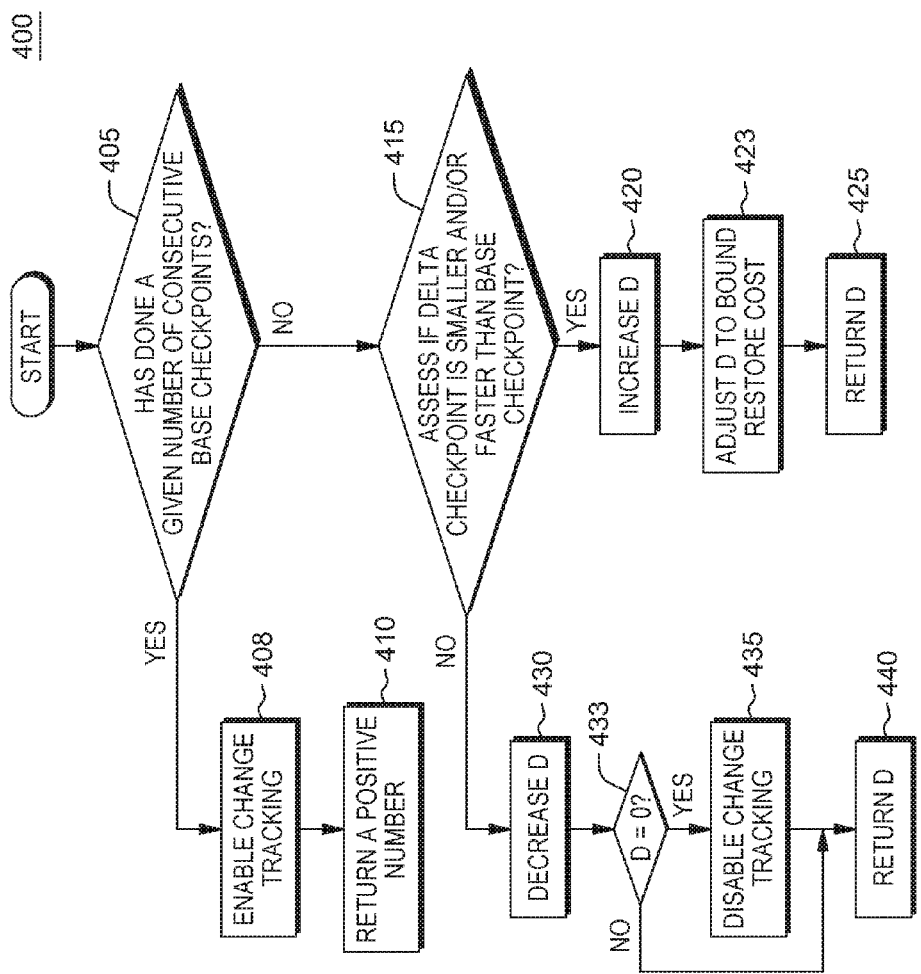
FIG. 8 shows one embodiment of an online method that adapts a Delta Checkpoint Number parameter D in reaction to runtime variations of the change pattern of operator state.

FIG. 8 shows one embodiment of an online algorithm 400 that implements the adjustD( ) function called in step 312 to adapt the Delta Checkpoint Number parameter D in reaction to runtime variations of the change pattern of operator state. The functionality in FIG. 8 depicts the determining the number of consecutive delta checkpoints to take, i.e., a Delta Checkpoint Number denoted as "D". That is, in achieving good performance with incremental checkpointing requires managing two trade-offs described in [0040]: first, the overhead of tracking changes to operator state must be paid off by savings in checkpointing cost; second, the worst-case restoration cost must be kept to an acceptable level.

The Delta Checkpoint Number D is a single parameter which can be used to manage both trade-offs at the same time: the number of consecutive delta checkpoints between two base checkpoints. Regarding the first trade-off, suppose the delta checkpointing time is shorter than full state checkpointing. In this case, increasing the Delta Checkpoint Number D would gain more benefit from incremental checkpointing. On the other hand, if incremental checkpointing does not pay off, decreasing the Delta Checkpoint Number would alleviate the negative impact to application runtime. In the case where the operator state is changed completely between two checkpoints, the Delta Checkpoint Number can be set to 0 and change tracking be disabled to fall back the baseline, i.e., full state checkpointing. Regarding the second trade-off, the worst-case restoration cost is for restoring the last delta checkpoint (the $D^{th}$ delta checkpoint), so the worst-case restoration cost can be bounded by capping the Delta Checkpoint Number D.

In FIG. 8, the method 400, also referred to as the adjustD( ) function, includes a first step at 405 of determining whether a given specified number of consecutive base checkpoints has been taken. If a number of base checkpoints has been taken, then at 408, the process enables change tracking and returns a positive number for parameter "D" at 410. Returning to 405, if it is determined that there has not been performed the given number of consecutive base checkpoints, then the process proceeds to 415 where a determination is made as to whether the delta checkpoint is smaller or faster than the base checkpoint. In one embodiment, this determination ensures that the following inequality holds:

$TckptBase+Tcomp>TckptDelta+Tcomp+Tlog$

That is:

$TckptBase>TckptDelta+Tlog$ where "TckptBase" is the time duration parameter for performing a full operator state checkpoint, "Tlog" is the time duration parameter representing the time it takes to log the changes to operator state data, and "TckptDelta" is the time duration parameter for checkpointing only logged changes to operator state data. In one embodiment, there may be used measured historical checkpoint time/sizes to determine the values for TckptBase, Tcomp, TckptDelta and Tlog parameter values, as measured and collected at 309 and 319.

As an example, to determine a value D the method performs estimating of TckptBase and TckptDelta+Tlog based on measured timing results of previous checkpoints. For example, TckptBase is estimated as the latest base checkpoint time; TckptDelta is a weighted average time of delta checkpoint times; and Tlog=TckptDelta*ratio, (e.g., ratio=10%) in one implementation. With estimated TckptBase and Tlog+TckptI, it can be determined if incremental checkpointing is beneficial and if so: increase D to a larger value at 420; otherwise decrease D to a smaller value at 430.

In one embodiment, checkpoint size instead of checkpoint time may be used to determine whether incremental checkpointing is beneficial. The method may compare weighted average size of recent delta checkpoints with the size of the latest base checkpoint at step 415. The average delta checkpoint size may be enlarged by some extent (e.g., 10%) in the comparison at step 415. The enlarged portion is to account for the cost of logging. To balance the trade-off between reducing checkpointing cost vs. increasing overhead to normal computation, the total cost of taking a delta checkpoint and tracking changes should be smaller than the cost of checkpointing full state. In one embodiment, the average delta checkpoint size may be enlarged by 10%, meaning that the cost of logging is estimated to be 10% of checkpointing the changes. This is an over-estimation, as tracking changes to in-memory state is much faster than writing checkpoint to storage. Such over-estimation helps ruling out cases with marginal return in applying incremental checkpointing. By assessing the benefit of incremental checkpointing at 415, the algorithm covers the first trade-off in [0040].

For example, returning to FIG. 6, with respect to obtaining base and delta checkpoint time/size parameter values, the stream processing system 15 at runtime is configured to measure checkpoint time/size of base checkpoints and delta checkpoints in time period 160 between two consecutive base checkpoints 105 and 155. The decision regarding how to adjust the parameter D is made at 155 as part of taking a new base checkpoint. The measured time of previous base and delta checkpoints may be used to decide if incremental checkpointing is beneficial. The runtime environment will measure checkpoint times/sizes, to obtain a history of base and delta checkpoint times/sizes.

Returning to FIG. 8. if the delta checkpoint size is smaller and/or speedier in time to take than the base checkpoint size and speed, the process proceeds to 420 in order to increase the parameter D so that more delta checkpoints will be taken. Subsequently, at 423, the value of D is adjusted in order to bound the restoration cost. That is, D is adjusted to ensure that the worst-case restoration cost is kept to an acceptable level. Then at 425 the value of D is returned to the checkpointing component running the incremental checkpointing algorithm in FIG. 7.

In one embodiment, the algorithm bounds the restoration cost by capping the Delta Checkpoint Number D at 423 as follows. It may use the average delta checkpoint size and base checkpoint size to calculate the maximum number of consecutive delta checkpoints whose total size does not exceed a configured ratio of a base checkpoint size. That is, the total size of delta checkpoints may be specified as not exceeding a ratio (e.g., 1) of a base checkpoints. For example, assume the average delta checkpoint size is 100 Bytes and the current base checkpoint is 400 Bytes. With a given ratio of 1.5, the total size of consecutive delta checkpoints, in this example, should be no larger than 400× 1.5=600 Bytes. So the Delta Checkpoint Number D should be no larger than a value 600/100=6. The adjustD( ) method ensures the new Delta Checkpoint Number does not exceed this maximum value at step 423, FIG. 8. By setting the ratio between a full checkpoint and aggregated size of consecutive delta checkpoints, one can bound the worst-case restoration cost with respect to the baseline restoration cost (i.e., the cost to restore a full checkpoint).

In another embodiment, there may be specified a maximum value for Delta Checkpoint Number D (e.g., there can be at most 5 consecutive delta checkpoints). Then at 423, the value of D is compared with the specified maximum value and the smaller of the two is used as the new value of D to be returned at 425.

In a further embodiment, there may be specified a hard limit on the worst-case restoration time (e.g., 1.0 second). The worst-case restoration time TR is the total time of reading a base checkpoint plus reading and applying all D delta checkpoints.

$$TR=TR(\text{base checkpoint})+TR(\text{delta checkpoint 1})$$

$$+TR(\text{delta checkpoint 2})$$

$$\ldots$$

$$+TR(\text{delta checkpoint } D)$$

where TR(base checkpoint) is the time for restoring a base checkpoint, and quantity TR(delta checkpoint i) is the restoration time for restoring the i-th delta checkpoint. In one embodiment, those times can be estimated by using measured historical checkpoint times. For example, as the checkpoint time TckptBase is already known for the base checkpoint, there is estimated a value $$TR(\text{base checkpoint})=TckptBase*1.2.$$

where the time to restore a base checkpoint (i.e., TR(base)) is estimated to be 1.2 times of the time to take a base checkpoint (TckptBase). For most checkpoint data stores, the read performance is actually faster than write performance (e.g., during checkpointing, data may be written to multiple replicas, but during restoration, only one copy is read back). Therefore, such estimation is over-estimation and conservative.

Similarly, the average time to restore a delta checkpoint may be estimated by using the average checkpoint time of recent delta checkpoints, e.g., $$\text{average}(TR(\text{delta}))=\text{average}(Tckpt\text{Delta})*1.2.$$

In one embodiment, if user provides via an interface an upper bound of restore time, e.g., TRmax, then there is calculated maximum value of D (Dmax) by solving the following inequality:

$$Tckpt\text{Base}*1.2+Dmax*\text{average}(Tckpt\text{Delta})*1.2<TR\text{max}.$$

Returning to FIG. 8, step 415, if it is determined that the delta checkpoint size is not smaller nor speedier in time to take than the base checkpoint, then the process proceeds to 430 where the number D is decreased. Then, at 433, a determination is made as to whether the current value of D is zero. If the current value of D is not zero, the method proceeds to 440 where the value of D is returned to the checkpointing component running the incremental checkpointing algorithm in FIG. 7. Otherwise, if at 433 it is determined that the current value of D is zero, then change tracking is disabled at 435 and then the current value of D is returned at 440.

As mentioned, in cases incremental checkpointing is not beneficial, the algorithm in FIG. 8 decreases the Delta Checkpoint Number at 430, and eventually sets it to zero. Since then change tracking is disabled at 435 and the operator is checkpointed in full form. However, as the change pattern of operator state evolves over time, incremental checkpointing may later become beneficial. To cope with this situation, the algorithm enters a "probing" mode once the Delta Checkpoint Number becomes zero. In one embodiment, the algorithm starts counting the number of full checkpoints, and once it is determined that it reaches a threshold (e.g., 10 full checkpoints in a row) at 405, it resets the Delta Checkpoint Number to a positive number at 410 and re-enables change tracking at 408 to force the next checkpoint to be a delta checkpoint. This way, the system can obtain the size of a delta checkpoint, and upon the base checkpoint after the delta checkpoint, it can assess, based on recent statistics, whether incremental checkpointing has become beneficial at 415. If so, it further increases the Delta Checkpoint Number at 420; Otherwise, it decreases the Delta Checkpoint Number to zero again at 430 and disables change tracking at 435, and the operator falls back to making full checkpoints until the next probing point.

The algorithm of FIG. 8 is adaptive to dynamics in the change pattern of operator state. In one embodiment, it adapts to dynamics in the change patterns of the same operator over time; and adapts to different operators within the same application. Incremental checkpointing techniques herein exploit the change pattern in operator's state and apply incremental checkpointing when it's beneficial. It may further turn off logging and incremental checkpointing when it's not beneficial. Additionally, it may adjust the Delta Checkpoint Number to respect a user-specified restoration cost limit. Its adaptiveness not only helps improving application performance, but saves users the burden of manual tuning.

The overhead of the algorithm shown in FIG. 8 is negligible. The algorithm is invoked every time an operator is checkpointed. The time complexity of each invocation is constant and can be omitted with respect to the time to write checkpoint to storage. The size of each checkpoint can be obtained via consulting the data serialization facility after the operator state has been serialized, and incurs negligible overhead. For each operator, the algorithm keeps a small amount of information (i.e., he weighted average of delta checkpoint size and the number checkpoints made since last base checkpoint), so the memory overhead is negligible.

Deleting Checkpoints

Figure 9:
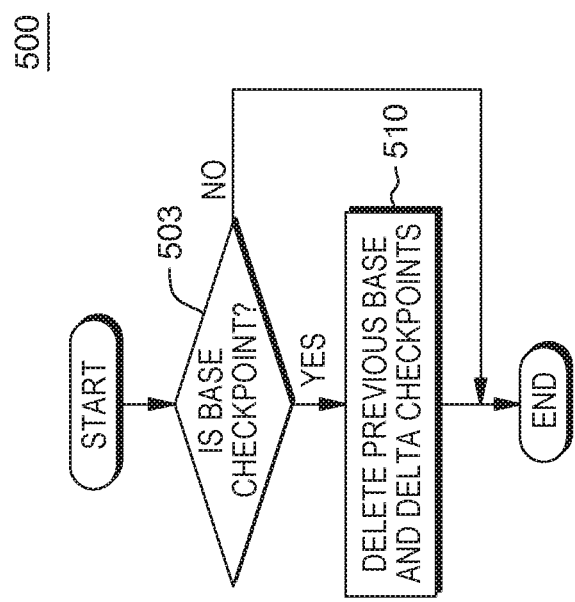
FIG. 9 shows one embodiment of a method 500 for deleting checkpoints.

FIG. 9 shows one embodiment of a method 500 for deleting incremental checkpoints. At 503, a decision is made as to whether a base checkpoint is to be deleted. If not, the method ends. If at 503 it is determined that a base checkpoint is to be deleted, then the process proceeds to 505 in which the checkpointing component deletes any base and delta checkpoints prior to the base checkpoint to be deleted.

In deleting an old checkpoint it must be ensured that the dependency is maintained. The runtime methods keep identifiers (sequence numbers) of the latest base checkpoint and delta checkpoints performed so far, and delete incremental checkpoints in a delayed fashion. That is, the runtime method deletes old checkpoints to respect the dependency between checkpoints. It maintains a record of checkpoint sequence numbers since last base checkpoint, and deletes those checkpoints after a new base checkpoint is taken.

In one embodiment, to delete an old checkpoint from the checkpoint data store, there is first determined whether there is any subsequent delta checkpoint which depends on the checkpoint to be deleted. If there is any dependent checkpoint, the method marks the given checkpoint as "to be deleted" and maintains marks either in deleting program's local memory or in the local operator memory. If there is no dependent checkpoint, deleting the given checkpoint. In addition, there is performed checking if the previous checkpoints on which the given checkpoint is dependent are all marked as "to be deleted". If so, deleting all those checkpoints.

Organizing Checkpoints in Key-Value Stores

There is further provided a method to organize incremental checkpoints in a key-value store. This method is applicable to many key-value stores and achieves high I/O and storage efficiency.

To achieve generality, data organization according to the methods herein is based on an abstract key-value store model. It is assumed a key-value store has a two-level name space. At the higher level is a set of store entries each of which is uniquely identified by a name. Each store entry itself is a set of key-value pairs. Within a store entry, each key-value pair consists of a unique key which is a byte string and a value which is also a byte string. The size of a value is subject to certain maximum limit. A user can create and delete a store entry by its name, and put, get, and delete a key-value pair within a given store entry. Such a key-value store abstraction can be easily implemented on top of many existing key-value stores such as with several example KV stores from Redis® is a networked key-value store. It provides rich data types, and the value of a key-value pair can be a byte string, a hash table, or a list, etc. The abstract key-value store model may be realized on top of Redis® by storing a store entry as a Redis® hash table named by the store entry name. Putting, getting, and deleting a key-value pair within a store entry can be implemented by the Redis® HSET, HGET, and HDEL commands with the key-value pair on the store entry's hash table, respectively. The size limit of a value is 512 MB in Redis®.

LevelDB® is an embedded key-value store (Leveldb® is a trademark of Google Inc.). Unlike Redis®, LevelDB® supports byte string as value. The abstract key-value store model can be realized with LevelDB® by storing each store entry as a separate LevelDB® database in a common directory. The key-value pairs within a store entry are saved as key-value pairs in the corresponding LevelDB® database, and the put, get, and delete operations can directly map to LevelDB®'s Put( ), Get( ), and Delete( ) APIs. LevelDB® does not limit the value size, so a size limit can be configured to an arbitrary number.

In one embodiment, an approach to organize checkpoints in the abstract key-value store model is to create a store entry for each operator, and store each checkpoint as a key-value pair whose key is a checkpoint sequence number and value is the serialized operator state. However, this is not sufficient for a checkpoint which exceeds the size limit of a single value.

To store an arbitrarily large key-value pair under the constraint of value size limit, a large value is broken into multiple chunks that fit within the size limit and store the original key-value pair as multiple key-value pairs. For a key-value pair whose value is of size M, the value is broken into chunks of size C. The chunk size C may be a configurable parameter for each key-value pair upon its insertion into the store entry. The original value is then broken into [M/C] chunks. The it chunk is keyed by
"originalKey:i".

Besides, a key-value pair termed chunk header is added. Chunk header's key is "originalKey:H". Its value is a concatenation of three integers: the chunk size, last chunk's index, and last chunk's size.

Operator state to checkpoint is usually a set of in-memory variables. When changes are tracked and checkpointed at the variable level, the dependency between checkpoints drills down to the individual variables.

Figure 10:
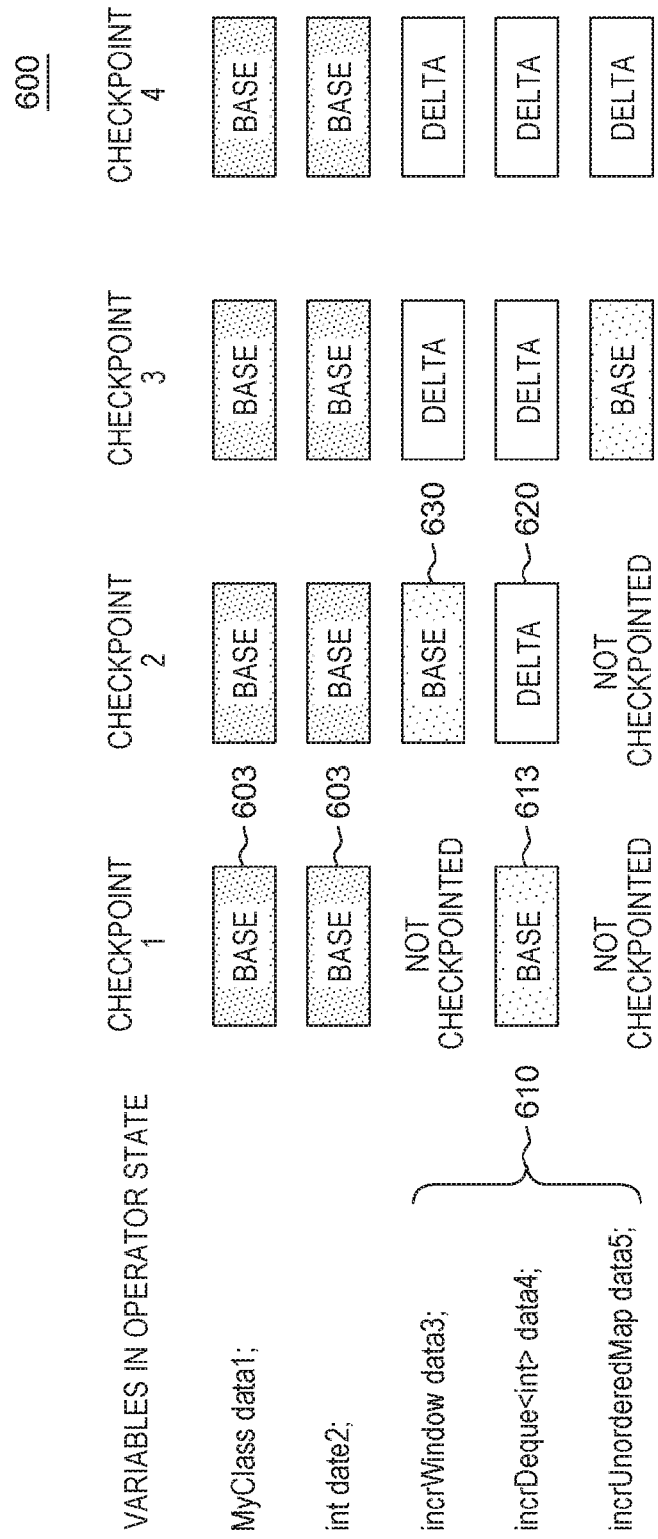
FIG. 10 shows an example data storage structure for an operator which store several variables ("data1" to "data5") in serialized form over multiple checkpoints Checkpoint 1, Checkpoint 2, Checkpoint 3, etc.

FIG. 10 shows an example operator state 600 which stores several variables ("data1" to "data5") in multiple checkpoints (e.g., Checkpoint1, Checkpoint 2, Checkpoint 3, etc.).

FIG. 10 shows declarations of variable data types with the first two variables ("data1" and "data2") not to be incrementally checkpointed and in checkpoints 603 these two variables are always checkpointed in full form. The next three variables ("data3", "data4", and "data5") 610 are declared as incremental types and subject to change tracking and incremental checkpointing. The example operator state 600 demonstrates that each variable has its own dependency chain. For example, data variable "data4" is first incrementally checkpointed in Checkpoint 2 and is in base full form even though Checkpoint 2 is a delta checkpoint.

When restoring a variable, that variable's own dependency chain is followed to find related checkpoints. To record the dependency between checkpoints, there is built additional index data and store the index alongside the serialized checkpoint data.

Figure 11:
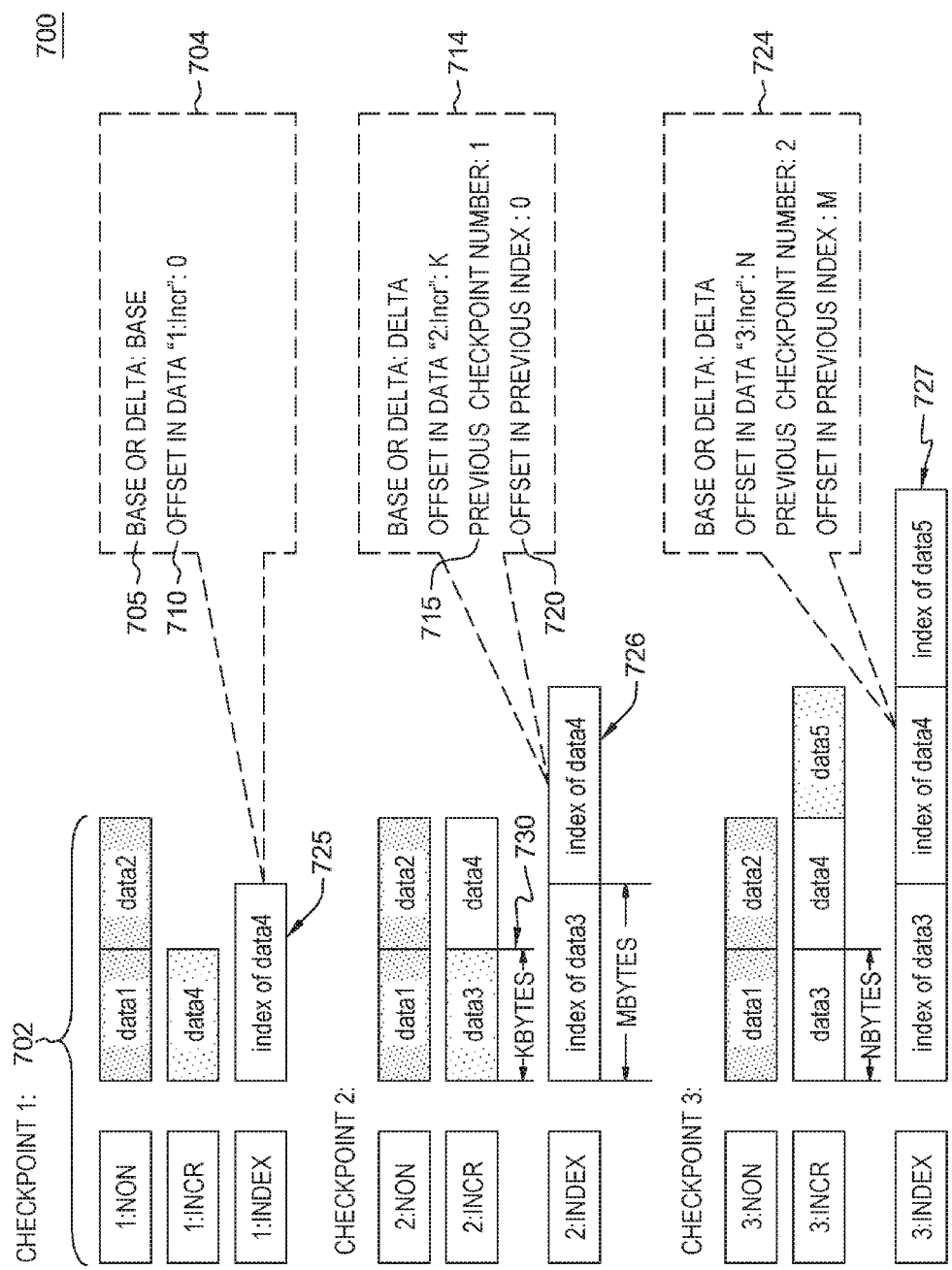
FIG. 11 shows an example recording of the dependency between checkpoints taken for the example operator at checkpoints Checkpoint 1, Checkpoint 2, etc. shown according to the serialized checkpoint data structure of FIG. 10.

FIG. 11 shows an example recording 700 of the dependency between checkpoints taken for the example operator 600 shown in FIG. 10. For a given checkpoint, e.g., Checkpoint1, there is stored three information types 702: 1) the data of the full checkpointed (non-incrementally checkpointed) variable(s), e.g., the first two variables "data1", "data2" shown in FIG. 10; 2) the data of the incrementally checkpointed variable(s), e.g., "data3", "data4", and "data5"; and 3) additional index data 725 for storing index data for each of the incrementally checkpointed variable(s), e.g., for variables "data3", "data4", and "data5".

In one embodiment, in each checkpoint, all the non-incrementally checkpointed variables (e.g., "data1" and "data2" in FIG. 11) may be serialized and concatenated into one byte string, and form a key-value pair whose value is the concatenated byte string. The key to the key-value pair may be a string in the form of "checkpointSequenceNumber:NON" (e.g., "1:NON" in Checkpoint1 and "2:NON" in Checkpoint 2 in FIG. 11). All the incrementally checkpointed variables (e.g., "data3", "data4", and "data5" in FIG. 11) may be serialized and concatenated into a separate byte string, and form a key-value pair with the value being the concatenated byte string and the key being "checkpointSequenceNumber" (e.g., "1:INCR" in Checkpoint 1 and "2:INCR" in Checkpoint 2 in FIG. 11). For each incrementally checkpointed variable, there may be stored additional index data, and all the index data are serialized and concatenated into a third byte string and form a key-value pair whose key is "checkpointSequenceNumber:INDEX" (e.g., "1:INDEX" in Checkpoint 1 and "2:INDEX" in Checkpoint 2 in FIG. 11). Each variable's index has at least two fields: i) type indicator (whether the variable is in base or delta form), ii) offset of the serialized variable in the byte string of "checkpointSequenceNumber:INCR". If the variable is in delta form, the index further contains iii) Sequence number of the checkpoint which contains the previous version of the variable, iv) offset of the index entry in the previous checkpoint's index key-value pair. Fields iii) and iv) are used to traverse the dependency chain of the variable and retrieve all previous versions until the base version.

Thus, for the example incremental checkpoint at Checkpoint 1 of variable "data4", there may be stored additional index data 704 including: a corresponding indicator 705 as "data4" being in base or delta form, e.g., "Base"; an offset value 710, e.g., Offset in "checkpointSequenceNumber:INCR" (e.g., "1:INCR"), having a value of 0 which indicates the starting position of serialized variable "data4" in the "checkpointSequenceNumber:INCR" serialized byte string (e.g., the offset of "data4" in "1:INCR" is 0).

For the next example checkpoint Checkpoint 2, FIG. 11 shows stored the first two variables "data1" and "data2"

again as not being incrementally checkpointed but are serialized into the "2:NON" key-value pair. Variable "data3" is checkpointed in base form 630 in Checkpoint 2; and variable "data4" is checkpointed in delta form 620 in Checkpoint 2. Both "data3" and "data4" are serialized into the "2:INCR" key-value pair. Furthermore, FIG. 11 shows the index data 726 having additional index data for the incrementally checkpointed variables (e.g., "data3" and "data4"). For the variable "data4", index data 714 shows a corresponding indicator for this variable data as being in "Delta" form in Checkpoint 2; an Offset in "2:INCR" indicating the starting position of serialized variable "data4" in the serialized byte string keyed by "2:INCR" (e.g., a value of "K" bytes as shown by arrow 730 in FIG. 11); sequence number 715 of previous dependent checkpoint (e.g., a value of "1" indicating "data4" in Checkpoint 2 is the changes made to "data4" since Checkpoint 1); and the index offset 720 of a previous dependent checkpoint as 0 (as index of "data4" in Checkpoint 1 is at the position 0 in the value of "1:INDEX" key-value pair).

Thus, when an operator state is checkpointed, all the variables in operator state are serialized into internal memory buffers in the checkpointing component 50, and data of different types are serialized into different buffers, and transferred to the checkpoint data store as key-value pairs; and the checkpointing component internally maintains the sequence numbers of base and delta checkpoints and automatically generates index data for those incrementally checkpointed variables.

For the variables shown in FIG. 10, an example checkpoint operation may be structured in C++ code as:
void MY_OPERATOR::checkpoint(Checkpont & ckpt) {
 ckpt<<data1;
 ckpt<<data2;
 ckpt<<data3;
 ckpt<<data4;
 ckpt<<data5;
}
Restoring Checkpoints When restoring operator state from a given checkpoint, variables are deserialized in the same order of checkpointing, so the index data of the given checkpoint are scanned in sequential order. For each variable being restored, the current index is consulted. First, the restoration method decides whether the variable is in base or delta form in current checkpoint. If it is in base form, the serialized variable is located according to the starting offset recorded in index Field ii and the variable is deserialized from it. If it is in delta form, the index Fields iii and iv are used to traverse all previous index entries, and use those index entries to locate and retrieve the previous versions of the variables, and merge them locally to restore the variable.

Figure 12:
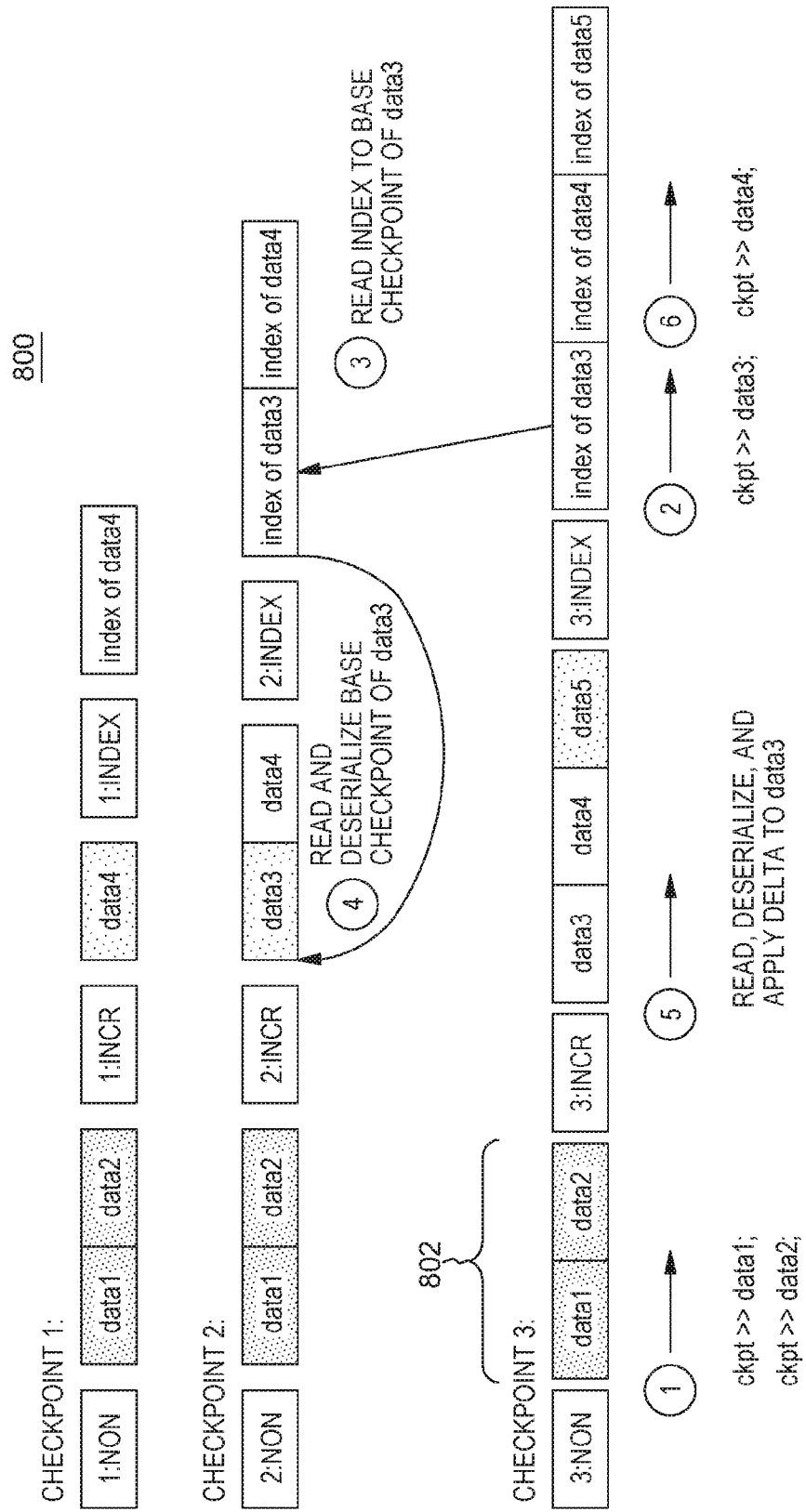
FIG. 12 represents an example restore operation 800 for all the checkpointed variables in the example checkpointing scenario shown in FIGS. 10-11.

For the five variables shown in FIG. 10, an example "restoration" operation may be structured in C++ code as:
void MY_OPERATOR::reset(Checkpont & ckpt) {
 ckpt>>data1;
 ckpt>>data2;
 ckpt>>data3;
 ckpt>>data4;
 ckpt>>data5;
}
FIG. 12 represents an example restoration operation 800 for all the checkpointed variables in the example checkpointing scenario shown in FIGS. 10-11.

In FIG. 12, a restoration operation (1) shows the restoring 802 of the non-incrementally checkpointed first and second data variables ("data1", "data2") directly from Checkpoint 3. Then, the restoration operation proceeds to the third data variable "data3" at (2) where "data3" is shown as being in delta form in Checkpoint 3. Then, at (3) there is reading of the index data in a previous dependent delta checkpoint Checkpoint 2; and based on the index information 726 which records the offset position of serialized "data3" in the "2:INCR" key-value pair, at (4) there is reading and deserializing the base form of "data3" from the "2:INCR" key-value pair in Checkpoint 1. The method traces back to operation (5) reading, deserializing, and re-applying delta checkpoints to "data3" taken at Checkpoint 3, which restores the variable "data3" to the state when Checkpoint 2 was taken. The restoration operation then proceeds to (6) restore the fourth variable "data4" in a similar manner as variable "data3".

Further embodiments for checkpointing optimizations are available. One further embodiment includes a reducing of the Indexing Cost: As an example implementation of an index entry that would consume 1+8=9 Bytes for base and 1+8+8+8=25 Bytes for a delta. If the checkpointed variable size is small (especially when it is in delta form), the index overhead can be substantial. The index entry size may be reduced by using a variable-length encoding format.

Figure 13A:
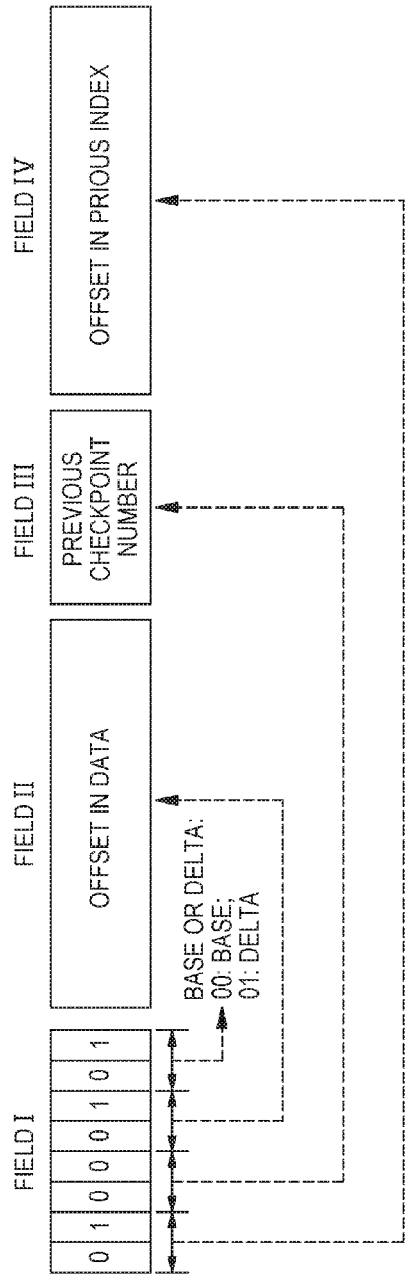
FIG. 13A shows an example of stored information, i.e., logged, delta checkpoint data.

FIG. 13A shows an implementation of a variable-length encoding format 975. As shown in FIG. 13A, Fields ii, iii and iv are each represented by an 8-bit, 16-bit, 32-bit, or 64-bit integer, and the shortest one which sufficiently covers the value is used. The first byte of an index entry is divided into 4 parts, 2 bits each. Bits 0-1 indicate the type (00 for base, 01 for delta). Bits 2-3 indicates whether index entry Field ii is a 8, 16, 32, or 64-bit integer (with Bits 2-3 being 00, 01, 10, 11, respectively). Similarly, bits 4-5 and bits 6-7 indicate how Field iii and iv are represented, respectively. Following the first byte are the integer values of Fields ii, iii and iv. This way, an index entry for base can be down to 2 Bytes and an index entry for a delta can be as small as 4 Bytes.

Figure 13B:
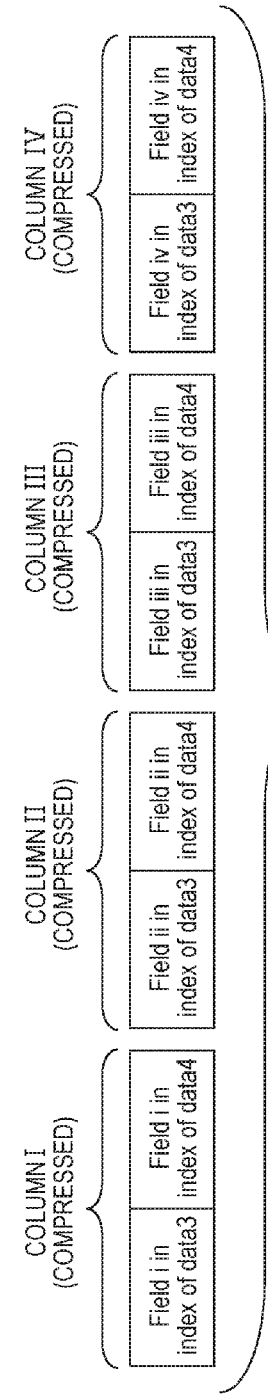
FIG. 13B shows an example column-oriented format of index for checkpointed variable data in one embodiment.

In a further embodiment, the index data may be reduced by first organizing the index fields in a column-oriented format and then compressing the fields. The same field of different index data is aligned together as a column, resulting in four columns for Fields i to iv, respectively. For example, in Checkpoint 2 shown in FIG. 11, the index 727 contains index data for two variables "data3" and "data4". FIG. 13B illustrates that in the column-oriented format, Field i of the two indices are aligned together to form Column i, Field ii of the two indices are aligned together to form Column ii, and so are Field iii and Field iv. Then, each column may be compressed by using certain compression method such as run-length encoding.

A further embodiment includes avoiding waste in restoring non-incrementally checkpointed data. This may be done by classifying the checkpointed variables into "incremental" and "non-incremental" data, based on how the data is restored. Restoring "incremental" data requires merging the versions in base and delta checkpoints, while "non-incremental" data is always checkpointed in full form and can directly restore from the latest checkpoint. As an example, suppose an operator has three variables to checkpoint. The first is a sliding window, the second is an integer counter, and the third is a hash table from a legacy library which only provides interfaces to serialize and deserialize the hash table in full form. When the sliding window is checkpointed, it saves the full window in a base checkpoint, and saves only the changed portion in each delta checkpoint. When restoring the sliding window from the latest delta checkpoint, it fetches the checkpointed window data in the base checkpoint and all related delta checkpoints and merge them. On the other hand, when the counter is checkpointed, in one embodiment, it always saves the counter value in checkpoint no matter whether it is a base or delta checkpoint. Upon restoring the counter from the latest delta checkpoint, it can directly restore the value saved in that delta checkpoint; there is no need to retrieve and merge older values. Similarly, since the hash table can only be checkpointed in full form, it can be restored just from the version in the latest checkpoint.

Those "non-incremental" data may be restored in the same way as "incremental" data by retrieving all versions and "merging" them via over-writing older versions in time order, if such retrieval and merge efforts is not costly. The "incremental" and "non-incremental" data of a checkpoint can be stored into separate key-value pairs to distinguish them and avoid the waste. For a checkpoint with sequence number K, all the serialized non-incremental data are concatenated into a byte string and keyed by "K:NON"; all the serialized incremental data are concatenated into another byte string and keyed by "K:INCR". The "incremental" data is indexed by a third KV pair "K:INDEX". By storing all "non-incremental" data in a separate key-value pair, the data access path involving index may be bypassed, and the "non-incremental" data restored directly from the latest checkpoint. Besides, this separated storage reduces index cost compared to an alternative approach which still stores "non-incremental" data together with "incremental" data, but uses a flag in each variable's index entry for distinction. With the separated storage, deletion of a checkpoint can be more aggressive: the "non-incremental" data can be deleted without delay but the "incremental" data could be deleted lazily.

A further optimization may include use of buffering to speed up a restoration: e.g., restoring a variable may require reading index and data from multiple checkpoints. The checkpoint data and index are read in chunks. Since variables are restored in the same order as checkpointing, the index and data chunks fetched for one variable is likely to be read soon for the next variable. Buffering may be used to exploit this locality and speed up restoration: any chunk fetched during restoration is kept in memory and only reclaimed when the intended read offset passes the chunk boundary or restoration is complete.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 14:
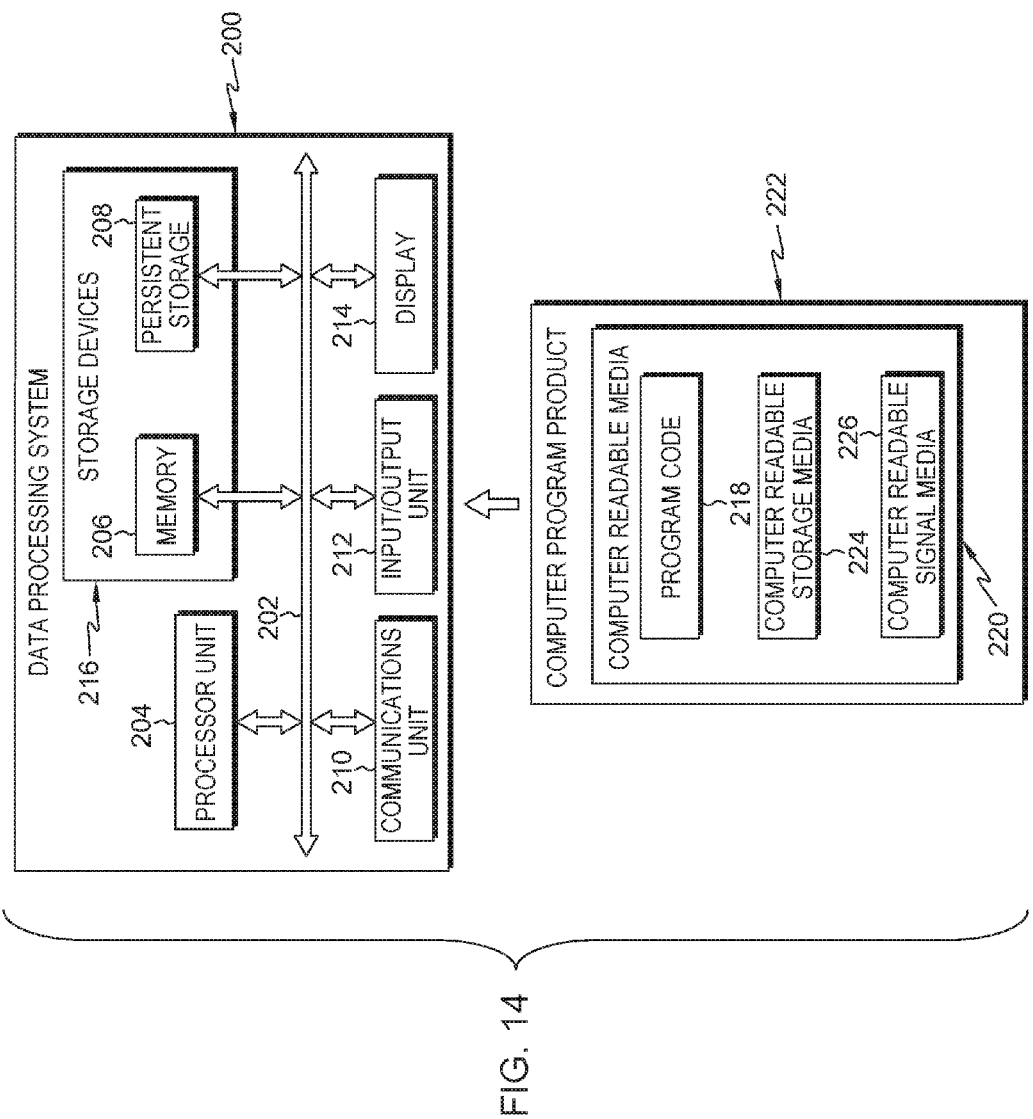
FIG. 14 depicts a diagram of a data processing system in accordance with an illustrative embodiment.

FIG. 14 depicts a diagram of a data processing system in accordance with an illustrative embodiment. Data processing system 200 is an example of a computer, such as server or client, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communication links, an optical fiber cable, a coaxial cable, a wire, and/or any other suitable type of communications link. In other words, the communications link and/or the connection may be physical or wireless in the illustrative examples.

The computer readable media also may take the form of non-tangible media, such as communications links or wireless transmissions containing the program code.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 14 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A computer-implemented method for adaptively and incrementally checkpointing an operator state in a data stream processing application comprising:
   during operation of the stream processing application, logging changes made to operator state, and one of:
   apply checkpointing to the operator state data according to a base checkpoint data form which saves data of a whole full operator state; or
   apply incremental checkpointing of only the logged changes to operator state as a delta checkpoint data in a data storage device;
   maintaining information about a dependency between checkpoints along with the checkpointed data;
   storing said dependency information in the data storage device; and
   upon performing a base checkpoint, determining adaptively how many subsequent checkpoints will be stored as delta checkpoints between two consecutive base checkpoints.

2. The computer-implemented method of claim 1, wherein the logging of changes to an operator state during normal computation further comprises:
   upon an update to an operator state, recording changes using one of: a user-level recording or an Operating System-level recording of the change made to the operator state;
   permitting the logging to be dynamically turned on or off; and
   optionally specifying by an operator whether to log changes to a variable or memory address range in operator state.

3. The computer-implemented method of claim 2, where the optional specification of whether to log changes to a variable or memory address range in operator state, further comprises:
   using one of: a language level annotation or type declaration, or by calling an application programming interface, or by setting a configuration interface, wherein for a variable or memory address range that is specified to be subject to logging, logging and tracking changes to the variable or memory address range during normal operation, and applying incremental checkpointing; and
   for a variable or a memory address range that is specified to be checkpointed non-incrementally, not tracking changes to that variable or memory address range and always checkpointing the whole variable or memory address range; or
   using a default logging and checkpointing option for the operator state data for which the operator does not explicitly specify whether to log changes to the data.

4. The computer-implemented method of claim 1, comprising periodically applying said checkpointing or incremental checkpointing of operator state, said method further comprising:
   assigning each checkpoint a unique ID;
   generating a base checkpoint by serializing the whole operator state and storing the serialized data into the data storage device; or
   generating a delta checkpoint by serializing the logged changes made to operator state, and storing all the serialized data into the data storage device.

5. The computer-implemented method of claim 1, wherein said determining adaptively how many subsequent checkpoints will be stored as delta checkpoints after a base checkpoint comprises:
   setting an initial number of subsequent delta checkpoints to take after a base checkpoint;
   measuring a time of taking each checkpoint, a size of each checkpoint, or both a time and size of each base and delta checkpoint;
   upon the completion of a base checkpoint:
   determining the measured time, size or both time and size of the previous base and delta checkpoints to assess whether incremental checkpointing outperforms checkpointing the full operator state, and one of:
if determining the incremental checkpointing outperforms the base checkpointing of full operator state, increasing the number of delta checkpoints to be generated before the next base checkpoint; otherwise
decreasing the number of delta checkpoints to be generated before the next base checkpoint.

6. The computer-implemented method of claim 5, further comprising:
receiving a specification of a constraint on a restoration cost of the operator state, wherein upon determining the number of delta checkpoints to be generated is to be increased, checking and adjusting a value according to the specified constraint of restoration cost to ensure the constraint is met, and determining a constraint of restoration cost exists by:
determining when the number of delta checkpoints to be generated is decreased to a value 0, and turning logging of operator state changes off; or
determining when the number of consecutive base checkpoints reaches a threshold, turning on logging again and forcing a next checkpoint to be a delta checkpoint.

7. The computer-implemented method of claim 6, wherein the specified constraint on restoration cost is of a form comprising:
a maximum number of delta checkpoints to generate between two base checkpoints; or
a worst-case restore time as one of: an absolute time value or a ratio value relative to time of restoring the full operator state; or
a maximum size of delta checkpoints between two base checkpoints as one of: an absolute size value or a ratio relative to a size value of the full operator state; or
using a default constraint when no constraint on restoration cost is specified.

8. The computer-implemented method of claim 1, wherein the maintaining information about the dependency between checkpoints along with the checkpointed data comprises:
maintaining the ID and an associated type including a base type for a base checkpoint or delta type for a delta checkpoint of last checkpoint internally; and
upon generating a new checkpoint, storing the type of this checkpoint, and if this checkpoint is in delta type, additionally storing the last checkpoint's ID and its location in the data storage device, along with the checkpoint data in the data storage device.

9. The computer-implemented method of claim 1, wherein the maintaining information about the dependency between checkpoints along with the checkpointed data further comprises:
deleting an old checkpoint from the data storage device, checking the dependency information to ensure that the checkpoint is only deleted when there is no other checkpoint which depends on it.

10. The computer-implemented method of claim 1, further comprising
restoring an operator state upon a detected processing application failure, and
using said stored dependency information and stored checkpoint data to restore the operator state accordingly, where the restoring an operator state from a checkpoint comprises one of:
determining whether a restoring is from a base checkpoint, and if so, retrieving and deserializing the checkpoint, and restoring the operator state from the checkpoint; or
determining whether a restoring is from a delta checkpoint, and if so, retrieving the base and all relevant delta checkpoints including the delta checkpoint to be restored, restoring the base checkpoint, and then restoring the delta checkpoints in order to restore the operator state.

11. A system for adaptively and incrementally checkpointing an operator state in a data stream processing application comprising:
a data storage device; and
a processor device running a data stream processing application in communication with the data storage device, the processor device further configured to:
during operation of the stream processing application, log changes made to an operator state, and one of:
apply a checkpoint the operator state according to a base checkpoint data form which saves data of a whole full operator state; or
apply an incremental checkpoint of only the logged changes made to operator state as a delta checkpoint data in a data storage device;
maintain information about a dependency between checkpoints along with the checkpointed data;
store said dependency information in the data storage device; and
upon performing a base checkpoint, determine adaptively how many subsequent checkpoints will be stored as delta checkpoints between two consecutive base checkpoints.

12. The system of claim 11, comprising periodically applying said checkpointing or incremental checkpointing of operator state, said method further comprising:
assigning each checkpoint a unique ID;
generating a base checkpoint by serializing the whole operator state and storing the serialized data into the data storage device; or
generating a delta checkpoint by serializing the logged changes made to operator state, and storing all the serialized data into the data storage device.

13. The system of claim 11, wherein to determine adaptively how many subsequent checkpoints will be stored as delta checkpoints after a base checkpoint, the processor device is further configured to:
set an initial number of subsequent delta checkpoints to take after a base checkpoint application;
measure a time of taking each checkpoint, a size of each checkpoint, or both a time and size of each base and delta checkpoint;
upon the completion of a base checkpoint:
determine the measured time, size or both time and size of the previous base and delta checkpoints to assess whether incremental checkpointing outperforms checkpointing the full operator state, and one of:
if determined that incremental checkpointing outperforms the base checkpointing of full operator state, increase the number of delta checkpoints to be generated before the next base checkpoint; otherwise
decrease the number of delta checkpoints to be generated before the next base checkpoint.

14. The system of claim 13, wherein said processor device is further configured to:
receive a specification of a constraint on a restoration cost of the operator state, and upon determining the number of delta checkpoints to be generated is to be increased, the processor device is further configured to:
check and adjust a value according to the specified constraint of restoration cost to ensure the constraint is met, and determine a constraint of restoration cost exists by:
determining when the number of delta checkpoints to be generated has decreased to a value 0, and turning logging of operator state changes off; or
determining when the number of consecutive base checkpoints reaches a threshold, turning on logging again and forcing a next checkpoint to be a delta checkpoint.

15. The system of claim 11, wherein said processor device is further configured to:
restore an operator state upon a detected stream processing application failure, and
use said stored dependency information and stored checkpoint data to restore the operator state accordingly, wherein to restore an operator state from a checkpoint the processor device performs one of:
determining whether a restoring is from a base checkpoint, and if so, retrieving and deserializing the checkpoint, and restoring all the operator state from the checkpoint; or
determining whether a restoring is from a delta checkpoint, and if so, retrieving the base and all relevant delta checkpoints including the delta checkpoint to be restored, restoring the base checkpoint, and then restoring the delta checkpoints in order to restore the operator state.

16. A computer program product for adaptively and incrementally checkpointing an operator state in a data stream processing application comprising:
a non-transitory computer readable storage medium readable by a processing circuit and storing instructions for execution by the processing circuit for performing a method, the method comprising:
during operation of the stream processing application, logging changes made to an operator state, and one of:
apply checkpointing to the operator state according to a base checkpoint data form which saves data of a whole full operator state; or
apply incremental checkpointing of only the logged changes made to operator state as a delta checkpoint data in a data storage device;
maintaining information about a dependency between checkpoints along with the checkpointed data;
storing said dependency information in the data storage device; and
upon performing a base checkpoint, determining adaptively how many subsequent checkpoints will be stored as delta checkpoints between two consecutive base checkpoints.

17. The computer program product of claim 16, wherein the method further comprises: periodically applying said checkpointing or incremental checkpointing of operator state, said method further comprising:
assigning each checkpoint a unique ID;
generating a base checkpoint by serializing the whole operator state and storing the serialized data into the data storage device; or
generating a delta checkpoint by serializing the logged changes made to operator state, and storing all the serialized data into the data storage device.

18. The computer program product of claim 16, wherein said determining adaptively how many subsequent checkpoints will be stored as delta checkpoints after a base checkpoint comprises:
setting an initial number of subsequent delta checkpoints to take after a base checkpoint application;
measuring a time of taking each checkpoint, a size of each checkpoint, or both a time and size of each base and delta checkpoint;
upon the completion of a base checkpoint:
determining the measured time, size or both time and size of the previous base and delta checkpoints to assess whether incremental checkpointing outperforms checkpointing the full operator state, and one of:
if determining the incremental checkpointing outperforms the base checkpointing of full operator state, increasing the number of delta checkpoints to be generated before the next base checkpoint; otherwise
decreasing the number of delta checkpoints to be generated before the next base checkpoint.

19. The computer program product of claim 16, wherein the method further comprises:
receiving a specification of a constraint on a restoration cost of the operator state, wherein upon determining the number of delta checkpoints to be generated is to be increased, checking and adjusting a value according to the specified constraint of restoration cost to ensure the constraint is met, and determining a constraint of restoration cost exists by:
determining when the number of delta checkpoints to be generated is decreased to a value 0, and turning logging of operator state changes off; or
determining when the number of consecutive base checkpoints reaches a threshold, turning on logging again and forcing a next checkpoint to be a delta checkpoint.

20. The computer program product of claim 16, wherein the maintaining information about the dependency between checkpoints along with the checkpointed data comprises:
maintaining the ID and an associated type including a base type for a base checkpoint or delta type for a delta checkpoint of last checkpoint internally; and
upon generating a new checkpoint, storing the type of this checkpoint, and if this checkpoint is in delta type, additionally storing the last checkpoint's ID and its location in the data storage device, along with the checkpoint data in the data storage device.

21. The computer program product of claim 16, wherein the method further comprises:
restoring an operator state upon a detected stream processing application failure, and
using said stored dependency information and stored checkpoint data to restore the operator state accordingly, where the restoring an operator state from a checkpoint comprises one of:
determining whether a restoring is from a base checkpoint, and if so, retrieving and deserializing the checkpoint, and restoring the operator state from the checkpoint; or
determining whether a restoring is from a delta checkpoint, retrieving and deserializing the checkpoint, and retrieving the base and all relevant delta checkpoints including the delta checkpoint to be restored, restoring the base checkpoint, and then restoring the delta checkpoints in order to restore the operator state.

* * * * *